United States Patent
Agrawal et al.

(10) Patent No.: US 11,966,565 B1
(45) Date of Patent: Apr. 23, 2024

(54) MOBILE DEVICE TASK VIEWS BASED ON CONTEXTUAL LEARNING

(71) Applicant: INTERNATIONAL BUSINESS MACHINES CORPORATION, Armonk, NY (US)

(72) Inventors: Tushar Agrawal, West Fargo, ND (US); Sarbajit K. Rakshit, Kolkata (IN); Jennifer M. Hatfield, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/301,696

(22) Filed: Apr. 17, 2023

(51) Int. Cl.
*G06F 3/0482* (2013.01)
*G06F 21/62* (2013.01)

(52) U.S. Cl.
CPC .......... *G06F 3/0482* (2013.01); *G06F 21/629* (2013.01)

(58) Field of Classification Search
CPC .............................. G06F 3/0482; G06F 21/629
See application file for complete search history.

(56) References Cited

U.S. PATENT DOCUMENTS

| | | | |
|---|---|---|---|
| 9,542,065 B2 | 1/2017 | Lacey et al. | |
| 11,182,045 B2 | 11/2021 | Johari | |
| 11,231,903 B2 | 1/2022 | Gruber et al. | |
| 2009/0055334 A1* | 2/2009 | Song | H04W 4/02 706/17 |
| 2014/0013271 A1* | 1/2014 | Moore | G06F 3/04883 715/792 |
| 2014/0215495 A1* | 7/2014 | Erich | G06F 11/3438 719/318 |
| 2016/0154656 A1* | 6/2016 | Illindala | G06F 9/453 715/708 |
| 2016/0189439 A1* | 6/2016 | Vetterick | G07C 5/006 701/29.4 |
| 2017/0344218 A1 | 11/2017 | Jann et al. | |
| 2019/0281095 A1* | 9/2019 | Ein-Gil | H04L 67/14 |
| 2019/0369842 A1* | 12/2019 | Dolbakian | G06F 3/0482 |
| 2020/0303938 A1* | 9/2020 | Owen | H01M 10/44 |
| 2021/0192259 A1 | 6/2021 | Songharsh et al. | |

FOREIGN PATENT DOCUMENTS

CN 113110829 A 7/2021

\* cited by examiner

*Primary Examiner* — Seth A Silverman
(74) *Attorney, Agent, or Firm* — David Spalding (57) ABSTRACT

A computer-implemented method, a computer system and a computer program product generate a contextual display for a mobile computing device. The method includes identifying a task for the mobile computing device, wherein the task comprises a set of applications on the mobile computing device. The method also includes obtaining application usage data for each application in the set of applications and determining an application context for the task based on the application usage data and the set of applications, wherein the application context includes usage requirements for each application. In addition, the method includes generating a tile view for each application in the set of applications, wherein each tile view is laid out based on the usage requirements. Lastly, the method includes displaying a task view on the mobile computing device, wherein the task view is generated by laying out the tile views based on the usage requirements.

20 Claims, 2 Drawing Sheets

MOBILE DEVICE TASK VIEWS BASED ON CONTEXTUAL LEARNING

BACKGROUND

Embodiments relate generally to the field of user interfaces on mobile computing devices and, in particular, to creating a task view on a mobile device based on contextual learning.

In the modern technology landscape, it may be common for users to complete everyday tasks using software applications, known as "apps," on mobile computing devices. Typical mobile devices may have several different apps installed, along with icons on a home screen for each app to indicate the app's presence on the mobile device and to provide a method for accessing the app. Apps that are available for mobile devices have proliferated to include many different types, which may range from a shopping app that may display products for sale and information about delivery of such products to the user to a weather app that may display current conditions and a forecast for any location that the user may choose. Everyday tasks may require the use of multiple apps, including disparate types, and therefore also a task view to more efficiently use the mobile computing device.

SUMMARY

An embodiment is directed to a computer-implemented method for generating a contextual display for a mobile computing device. The method may include identifying a task for the mobile computing device, where the task comprises a set of applications on the mobile computing device. The method may also include obtaining application usage data for each application in the set of applications. The method may further include determining an application context for the task based on the application usage data and the set of applications, wherein the application context includes usage requirements for each application in the set of applications. In addition, the method may include generating a tile view for each application in the set of applications based on the usage requirements. Lastly, the method may include displaying a task view on the mobile computing device, where the task view is generated by laying out the tile views for applications in the set of applications based on the usage requirements.

In another embodiment, the method may include monitoring user interactions with the task view and updating the application context based on the user interactions.

In a further embodiment, the updating the application context may include identifying a required application to complete the task based on the user interactions, where the required application is not installed on the mobile computing device. In this embodiment, the updating the application context may also include retrieving the required application from a remote server and installing the required application on the mobile computing device. Lastly, in this embodiment, the updating the application context may include adding the required application to the set of applications on the mobile computing device.

In yet another embodiment, the updating the application context may include updating the task view based on the usage requirements by modifying a layout of the tile views for the applications in the set of applications.

In still another embodiment, the determining the application context for the task may use a machine learning model that predicts the usage requirements for mobile computing applications to complete an assigned task based on prior application usage.

In another embodiment, the generating the tile view for an application may include determining that the application requires authentication for access to the application and, in response to determining that the authentication is successful, adding the tile view for the application to the task view for the mobile computing device.

In a further embodiment, the displaying the task view on the mobile computing device may include calculating a usage ranking for each application in the set of applications based on the application context and modifying the task view by moving the tile view for an application based on the usage ranking for the application.

In addition to a computer-implemented method, additional embodiments are directed to a computer system and a computer program product for generating a contextual display for a mobile computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In today's technology ecosystem, with ubiquitous mobile computing devices and software applications designed for those devices, everyday tasks, such as e-commerce or simple travel from one location to another, may be completed using the mobile computing device. A typical mobile computing device may have several software applications, or "apps," installed and running, with icons on a home screen of the mobile computing device that may be used to access the respective app. As usage of mobile computing devices has increased, there has been a corresponding proliferation of apps available for the devices. Apps may be categorized into several types, such as shopping apps for ordering and delivering products or weather apps for viewing current conditions or forecast later conditions in any location. Apps may also be used to view accounts and other personal information of the user, along with appropriate security measures to protect such information, and for many other aspects of daily life. If a user needs to complete a task with the mobile computing device, one or more apps may be used for the task and the user may open the apps that may be required. However, it may be onerous to open several apps individually through icons on a home screen for at least two important reasons: the burden of determining which apps to open and then opening the apps individually, and the size of the device screen, which, though perhaps expanding in recent years, may be too small to show all the possible information that may be needed for the task. In addition, some information from the app may not be relevant for the task and the need for logging in to one or more apps to view or modify personal information may be inefficient.

It may therefore be useful to provide a method or system to generate a task view for a mobile computing device based on contextual learning. Such a method or system may learn context from historical information about app usage on a device and the apps needed for a given task and generate individual tile views for each required app that may filter the information based on that context. These tile views may also be merged into a task view that may be displayed on the mobile computing device, where the display may also be customize according to the context and user feedback may be used to further refine the task view. Such a method or system, and task view, may use machine learning to increase the efficiency of the software applications on a mobile computing device, along with the device itself, by easing the user experience and contextualizing the vast array of information that may be loaded in the mobile computing device.

Figure 1:
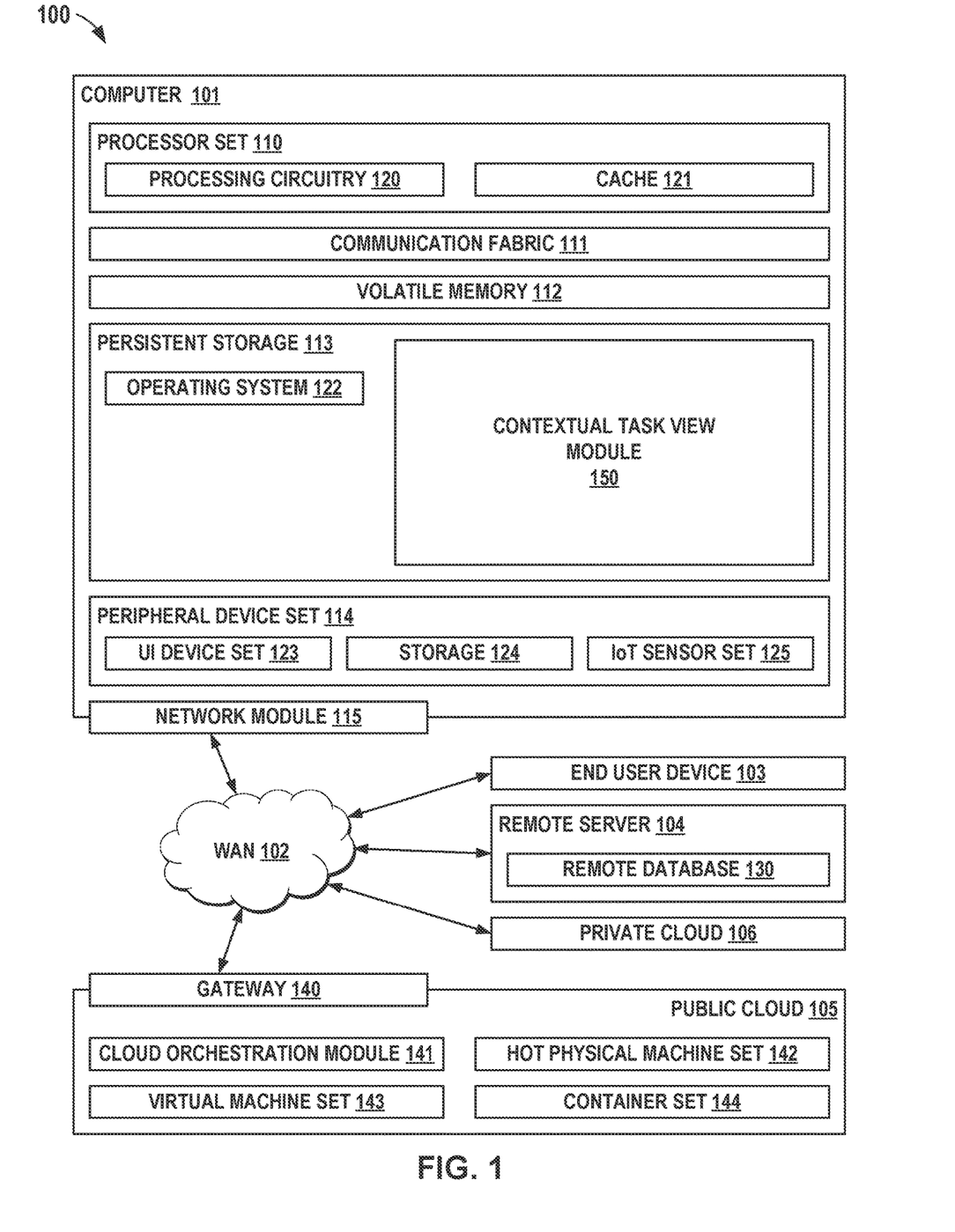
FIG. 1 depicts a block diagram of an example computer system in which various embodiments may be implemented.

Referring to FIG. 1, computing environment 100 contains an example of an environment for the execution of at least some of the computer code involved in performing the inventive methods, such as contextual task view module 150. In addition to contextual task view module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and contextual task view module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in contextual task view module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in contextual task view module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to generate a contextual display for a mobile computing device. In particular, contextual task view module 150 may identify a task to be performed on a mobile computing device, where a task may require the use of a certain set of software applications. At this point, historical usage data for each software application in the set of software applications may be obtained, where the historical usage data may draw from prior interactions between the user and the application, as well as account information or other profile information that may inform the contextual task view module 150 about how the software application may be typically used by the mobile computing device and other details about the software applications and the mobile computing device that may be relevant in the context of the task to be performed on the mobile computing device.

Based on the software applications in the set of software applications, or the software applications for the task, and also the historical usage data for each software application in the set, an application context may be determined for the task. In this step, the information that should be displayed on the mobile computing device, including but not limited to the size of a potential tile view for the software application or limits to general information that may be normally displayed in the software application, may be predicted with contextual learning that may be driven by a machine learning model. The machine learning model may be trained using the historical usage data and possibly rank the software applications by an importance of the software application to the task, where more relevant software applications may have a more prominent role in a task view that may be displayed. Application context as described herein may include any aspect of the software applications needed to complete an identified task and this step may add further software applications to the set of software applications or may delete software applications from the set if the application usage data indicates a need for further software applications to complete the task. From the application context, a tile view for each application in the set of software applications may be generated. The tile view may be a reproduction of the normal software application view but may also add or delete information as dictated by the application context and may also alter the layout of the tile view. One of ordinary skill in the art will recognize that there are many ways to create and alter a tile view for a software application on a mobile computing device. Lastly, the contextual task view module 150 may merge the tile views into a task view to be displayed on the mobile device, where the application context may guide the layout of the task view. As an example of the task view, if a product is being ordered and delivered, the task view may include the shopping app where the order was placed, a shipping app to track a shipment progress, a weather app to indicate conditions in a predicted timeframe for the delivery, and potentially a banking app to learn whether payment has been completed for the ordered item. The apps included in the task view, as well as detailed information that may appear within each app's tile view, may be arranged according to the application context, as described above, along with a customized layout for the tiles and the task view. The contextual task view module 150 may monitor how the task view may be used on the mobile computing device and refine its determination of application context, and therefore the tile views of each software application and the overall task view, based on this feedback.

Figure 2:
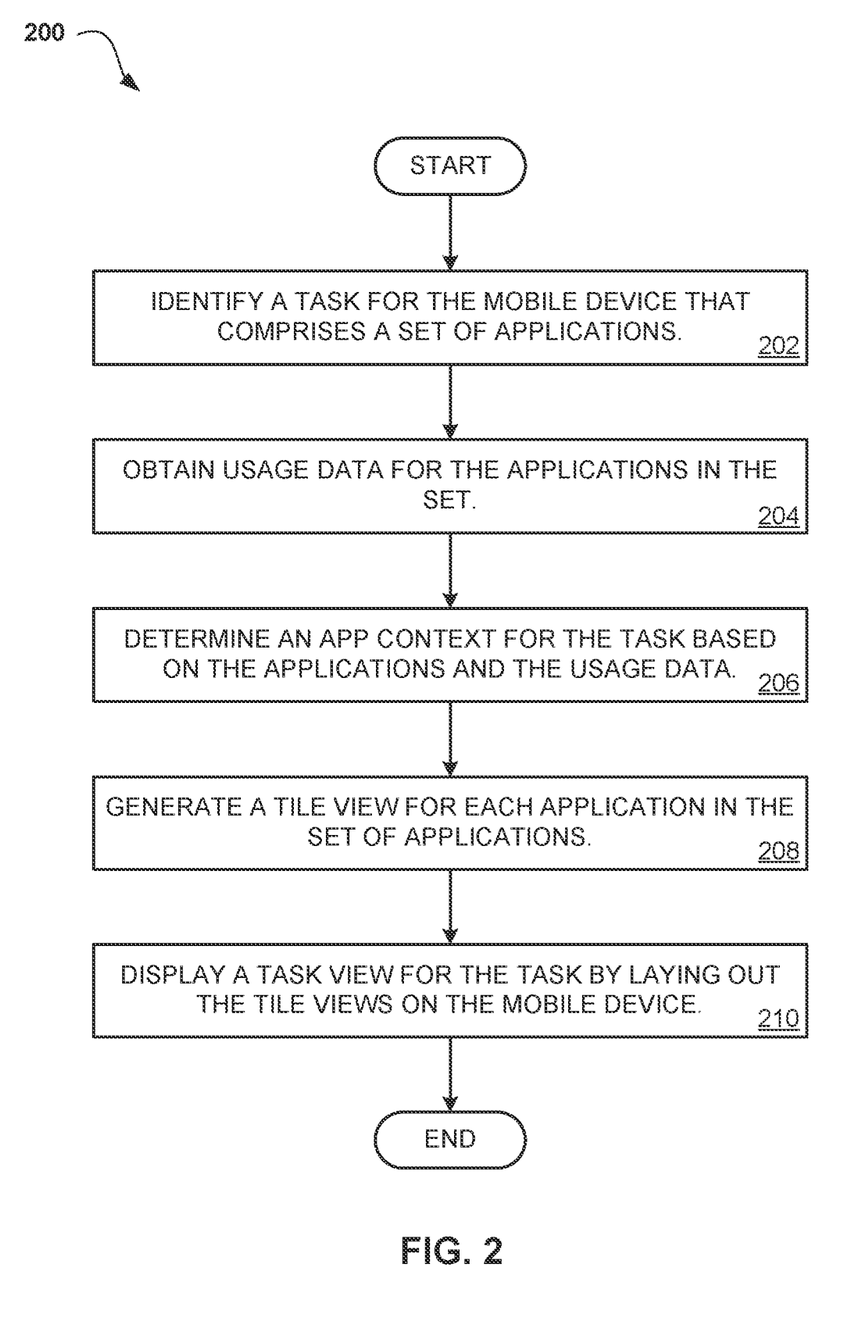
FIG. 2 depicts a flow chart diagram for a process that generates a contextual display for a mobile computing device according to an embodiment.

Referring to FIG. 2, an operational flowchart illustrating a process 200 that generates a contextual display for a mobile computing device is depicted according to at least one embodiment. At 202, a task for the mobile computing device may be identified. As described herein, a task may include a set of applications on the mobile computing device for completing the task. As an example, the task may be identified as determining the best driving route between two locations at a given time. The set of applications for the task may include a mapping application that may display map or GPS information, along with a recommendation from the application. Also included may be a weather app and a traffic, where both may display current conditions and a forecast for the estimated time of the trip. The mapping, weather and traffic apps may form the set of applications that may be included in the task. It is not required for the contextual task view module 150 to identify specifically the task to be performed by the mobile computing device, only the set of applications on the mobile computing device that may be needed to complete the task. In addition, the set of applications may be modified as the process 200 is followed, such that applications may be added or deleted from the set as the contextual learning may proceed.

At 204, application usage data may be obtained for each application in the set of applications. Application usage data as described herein may refer to any information relevant to how an application may be used on the mobile computing device. This may include, but is not limited to, historical information about the software application, such as locations for which a user may be interested in knowing traffic or whether conditions. This usage data may also include certain views that may be preferred for applications, such as window size or layout information. Application usage data may include information relevant to the software application in any context and not limited to a specific task that may have been performed on the mobile computing device in the past. As described herein, application usage data may exist locally on the mobile computing device or may be stored remotely in a dedicated cloud computing center or another server that may be connected to the mobile computing device using a network, including the public Internet.

It should be noted that all collection of data specific to a user of a mobile computing device or any video, audio or text that may personally identify the user of the mobile computing device or is sensitive in any other way requires the informed consent of all people whose information may be collected and analyzed. Consent may be obtained in real time or through a prior waiver or other process that informs a subject that their information may be captured by a device or other process and that the information may be used to create tile views of application and arrange the tile views into a task view to be displayed on the mobile computing device, as will be described in detail below. The information owner is free to decide at any time to revoke consent for use of sensitive information as these settings are permanently retained to keep complete control over their informed consent to use sensitive information in the process described herein. The consent described here may also refer to allowing some, or any, data relating to the information owner from being sent to a local server, cloud server or any other location. The owner has complete control on the transmission of information that may be sensitive or personally identify the owner of the information.

At 206, an application context may be determined for the task based on the application usage data and the set of applications. Application context may include usage requirements for applications to complete the task. As an example, the task may be tracking a delivery of an order from a website. The set of applications for such a task may include the shopping application that may have been used to order a product, a mapping application to show the local area between a warehouse or other location, including roads or other landmarks, and perhaps a recommended route, and also a weather application to show local conditions and perhaps a forecast for an estimated delivery time. In addition, traffic information may be included in the mapping application or a separate traffic application may be needed to provide traffic conditions and a forecast in the time window near the estimated delivery time. The application context may use an estimated delivery time and location to limit the normal information that may usually be provided on the mobile computing device to customize the information for the task. The presence of traffic information in the applications that may be present on the mobile computing device may also be an input to the determination of application context, such that the determination may add or delete applications from the set of applications already identified and also may modify the information that may be provided by any of the applications.

Other information that may be taken from the application usage data may be related to a suggested layout for the information on the screen of a mobile device. The suggested layout may relate to one or more applications individually, or the context may include laying out the information in the larger task view for the mobile computing device using knowledge of multiple applications to make the information more relevant to the task. A usage ranking may be calculated for each application based on the determined application context, such that the information from a given application may be more important to the task than others in the set of applications and therefore prioritized for display on the mobile computing device. In addition, application context may include a determination that certain applications may require authentication, such as a login or other security measure to protect sensitive information from being viewed, and such applications may be withheld from any generated tile views or task views if the authentication process is not completed separately.

In an embodiment, a supervised machine learning model may be trained to predict the usage requirements for mobile computing applications to complete an assigned task based on data about prior application usage. For a given mobile computing device, this may include predicting the set of applications required for the task, and therefore may add or delete from the set, as well as specific information that may be required within an application, such as the time window or location described above. Any prediction may also include suggesting a layout for one or more tile views of an application and may also include an overall layout for a task view that may include all of the application within the set of applications. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include prior tasks. The training data may be collected from a single interaction or task completed by the applications on the mobile computing device or from multiple interactions or tasks over a longer period of time. The results may be stored in a database so that the data is most current, and the output would always be up to date.

At 208, a tile view for each application in the set of applications may be generated based on the application context, whereby the tile views may be merged into an overall task view for the task. In merging the tile views that may be generated for each application in the set of applications into a task view, the tile views may be laid out according to the usage requirements or any other determined information from the application context. As mentioned above, application context may include both the information required for the task, thus customizing the contents of the application to meet the usage requirements of the task, and also the layout of each tile view and also the overall task view. While generating the tile view for a given application in the set, a determination may be made that the application requires authorization in order to function. For example, a banking application may need an account login to display any information. As a result, the module 150 may wait for the login to be provided before the tile view may be generated, or alternatively a generated tile view may be withheld from the task view until the login process is completed. In either case, the module 150 may not store the individual login information or perform any automatic login procedures by itself. Once the login process is complete, and in response to a successful authentication, the module 150 may function normally and generate a tile view for the application and include the tile view in a task view. It should be noted that both the tile view and task view may change as the application context changes. For instance, in the example above, if traffic information is not available within the mapping application, then a new tile may be added in the task view with a generated tile view for a traffic application, including adjusting the tile boundaries, as well as position of the new tile according to a potential usage ranking, to add the traffic application to the task view.

At 210, the task view may be displayed on the mobile computing device. As mentioned above, the screen of the mobile device may be arranged into tiles showing the applications and the task view may use all or part of the screen, where the layout and dimensions of the tile views and the larger task view may be adjusted to fit the mobile computing device. In addition, the larger task view may be generated by combining or merging the tile views that may be created for each application in the set of applications. This combining or merging may include placing the tile views in specific positions and also adjusting the size of individual tiles as the usage requirements and application context may dictate, or according to usage rankings as described herein. As a result, the tile views may be laid out, and tiles added or deleted or individually modified, at any point in the process 200.

The contextual task view module 150 may also receive feedback from the mobile computing device by monitoring user interactions with the task view, where the application context may also be updated to include information about the user interactions. User interactions in this step are not limited to information about the size or layout of the tile views or task view but may also include feedback about the information in the individual tile views, e.g., the time or location of the above examples or known traffic conditions from other sources that may not currently be included in the task view. In the last case, if the applications that may have been included in the set of applications do not adequately meet the usage requirements of the task, the set of applications may be modified, through addition or deletion, to adjust to the feedback. It should also be noted that, while the steps above refer to the applications already installed and running on the mobile computing device, it is also possible for the contextual task view module 150 to modify the set of applications for the task by requesting and downloading additional applications that may not currently be installed and running on the mobile computing device from a remote server. It is also not required that an application be local to the mobile computing device, only that an application be included in the set of applications for a task as defined above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a contextual display for a mobile computing device, the computer-implemented method comprising:
    identifying a set of applications on the mobile computing device, wherein the set of applications is required to complete an identified task using the mobile computing device;
    obtaining application usage data for each application in the set of applications;
    determining usage requirements for each application in the set of applications based on the identified task and the application usage data, wherein the usage requirements comprise information needed from an application in the set of applications to complete the identified task;
    generating tile views for each application in the set of applications, wherein each tile view is laid out based on the usage requirements for each application in the set of applications; and
    displaying a task view on the mobile computing device, wherein the task view is generated by laying out the tile views for each application in the set of applications based on the usage requirements for each application in the set of applications.

2. The computer-implemented method of claim 1, further comprising:
    monitoring user interactions with the task view on the mobile computing device; and
    updating the usage requirements for each application in the set of applications based on the user interactions.

3. The computer-implemented method of claim 2, wherein the updating the usage requirements for each application in the set of applications further comprises:
    identifying a required application to complete the identified task based on the user interactions, wherein the required application is not installed on the mobile computing device;
    retrieving the required application from a remote server;
    installing the required application on the mobile computing device; and
    adding the required application to the set of applications on the mobile computing device.

4. The computer-implemented method of claim 2, wherein the updating the usage requirements for each application in the set of applications further comprises updating the task view by modifying a layout of the tile views for each applications in the set of applications.

5. The computer-implemented method of claim 1, wherein the determining the usage requirements for each application in the set of applications uses a machine learning model that predicts the usage requirements for mobile computing applications to complete an assigned task based on prior application usage.

6. The computer-implemented method of claim 1, wherein the generating the tile views for each application in the set of applications further comprises:
    determining that the application in the set of applications requires authentication for access to the application in the set of applications; and in response to determining that the authentication is successful, adding the tile view for the application in the set of applications to the task view on the mobile computing device.

7. The computer-implemented method of claim 1, wherein the displaying the task view on the mobile computing device further comprises:
   calculating a usage ranking for each application in the set of applications based on the usage requirements for each application in the set of applications; and
   modifying the task view on the mobile computing device by moving the tile view for the application in the set of applications within the task view based on the usage ranking for the application in the set of applications.

8. A computer system for generating a contextual display for a mobile computing device, the computer system comprising:
   one or more processors, one or more computer-readable memories, and one or more computer-readable storage media;
   program instructions, stored on at least one of the one or more computer-readable storage media for execution by at least one of the one or more processors via at least one of the one or more memories, to identify a set of applications on the mobile computing device, wherein the set of applications is required to complete an identified task using the mobile computing device;
   program instructions, stored on at least one of the one or more computer-readable storage media for execution by at least one of the one or more processors via at least one of the one or more memories, to obtain application usage data for each application in the set of applications;
   program instructions, stored on at least one of the one or more computer-readable storage media for execution by at least one of the one or more processors via at least one of the one or more memories, to determine usage requirements for each application in the set of applications based on the identified task and the application usage data, wherein the usage requirements comprise information needed from an application in the set of applications to complete the identified task;
   program instructions, stored on at least one of the one or more computer-readable storage media for execution by at least one of the one or more processors via at least one of the one or more memories, to generate tile views for each application in the set of applications, wherein each tile view is laid out based on the usage requirements for each application in the set of applications; and
   program instructions, stored on at least one of the one or more computer-readable storage media for execution by at least one of the one or more processors via at least one of the one or more memories, to display a task view on the mobile computing device, wherein the task view is generated by laying out the tile views for each application in the set of applications based on the usage requirements for each application in the set of applications.

9. The computer system of claim 8, further comprising:
   program instructions, stored on at least one of the one or more computer-readable storage media for execution by at least one of the one or more processors via at least one of the one or more memories, to monitor user interactions with the task view on the mobile computing device; and
   program instructions, stored on at least one of the one or more computer-readable storage media for execution by at least one of the one or more processors via at least one of the one or more memories, to update the usage requirements for each application in the set of applications based on the user interactions.

10. The computer system of claim 9, wherein the updating the usage requirements for each application in the set of applications further comprises:
    program instructions, stored on at least one of the one or more computer-readable storage media for execution by at least one of the one or more processors via at least one of the one or more memories, to identify a required application to complete the identified task based on the user interactions, wherein the required application is not installed on the mobile computing device;
    program instructions, stored on at least one of the one or more computer-readable storage media for execution by at least one of the one or more processors via at least one of the one or more memories, to retrieve the required application from a remote server;
    program instructions, stored on at least one of the one or more computer-readable storage media for execution by at least one of the one or more processors via at least one of the one or more memories, to install the required application on the mobile computing device; and
    program instructions, stored on at least one of the one or more computer-readable storage media for execution by at least one of the one or more processors via at least one of the one or more memories, to add the required application to the set of applications on the mobile computing device.

11. The computer system of claim 9, wherein the updating the usage requirements for each application in the set of applications further comprises updating the task view by modifying a layout of the tile views for each applications in the set of applications.

12. The computer system of claim 8, wherein the determining the usage requirements for each application in the set of applications uses a machine learning model that predicts the usage requirements for mobile computing applications to complete an assigned task based on prior application usage.

13. The computer system of claim 8, wherein the generating the tile views for each application in the set of applications further comprises:
    program instructions, stored on at least one of the one or more computer-readable storage media for execution by at least one of the one or more processors via at least one of the one or more memories, to determine that the application in the set of applications requires authentication for access to the application in the set of applications; and
    program instructions, stored on at least one of the one or more computer-readable storage media for execution by at least one of the one or more processors via at least one of the one or more memories, to add the tile view for the application in the set of applications to the task view on the mobile computing device in response to determining that the authentication is successful.

14. The computer system of claim 8, wherein the displaying the task view on the mobile computing device further comprises:
    program instructions, stored on at least one of the one or more computer-readable storage media for execution by at least one of the one or more processors via at least one of the one or more memories, to calculate a usage ranking for each application in the set of applications based on the usage requirements for each application in the set of applications; and program instructions, stored on at least one of the one or more computer-readable storage media for execution by at least one of the one or more processors via at least one of the one or more memories, to modify the task view on the mobile computing device by moving the tile view for the application in the set of applications within the task view based on the usage ranking for the application in the set of applications.

15. A computer program product for generating a contextual display for a mobile computing device, the computer program product comprising:

one or more computer-readable storage media;

program instructions, stored on at least one of the one or more computer-readable storage media, to identify a set of applications on the mobile computing device, wherein the set of applications is required to complete an identified task using the mobile computing device;

program instructions, stored on at least one of the one or more computer-readable storage media, to obtain application usage data for each application in the set of applications;

program instructions, stored on at least one of the one or more computer-readable storage media, to determine usage requirements for each application in the set of applications based on the identified task and the application usage data, wherein the usage requirements comprise information needed from an application in the set of applications to complete the identified task;

program instructions, stored on at least one of the one or more computer-readable storage media, to generate tile views for each application in the set of applications, wherein each tile view is laid out based on the usage requirements for each application in the set of applications; and program instructions, stored on at least one of the one or more computer-readable storage media, to display a task view on the mobile computing device, wherein the task view is generated by laying out the tile views for applications in the set of applications based on the usage requirements.

16. The computer program product of claim 15, further comprising:

program instructions, stored on at least one of the one or more computer-readable storage media, to monitor user interactions with the task view on the mobile computing device; and program instructions, stored on at least one of the one or more computer-readable storage media, to update the usage requirements for each application in the set of applications based on the user interactions.

17. The computer program product of claim 16, wherein the updating the usage requirements for each application in the set of applications further comprises:

program instructions, stored on at least one of the one or more computer-readable storage media, to identify a required application to complete the identified task based on the user interactions, wherein the required application is not installed on the mobile computing device;

program instructions, stored on at least one of the one or more computer-readable storage media, to retrieve the required application from a remote server;

program instructions, stored on at least one of the one or more computer-readable storage media, to install the required application on the mobile computing device; and program instructions, stored on at least one of the one or more computer-readable storage media, to add the required application to the set of applications on the mobile computing device.

18. The computer program product of claim 15, wherein the determining the usage requirements for each application in the set of applications uses a machine learning model that predicts the usage requirements for mobile computing applications to complete an assigned task based on prior application usage.

19. The computer program product of claim 15, wherein the generating the tile views for each application in the set of applications further comprises:

program instructions, stored on at least one of the one or more computer-readable storage media, to determine that the application in the set of applications requires authentication for access to the application in the set of applications; and program instructions, stored on at least one of the one or more computer-readable storage media, to add the tile view for the application in the set of applications to the task view on the mobile computing device in response to determining that the authentication is successful.

20. The computer program product of claim 15, wherein the displaying the task view on the mobile computing device further comprises:

program instructions, stored on at least one of the one or more computer-readable storage media, to calculate a usage ranking for each application in the set of applications based on the usage requirements for each application in the set of applications; and program instructions, stored on at least one of the one or more computer-readable storage media, to modify the task view on the mobile computing device by moving the tile view for the application in the set of applications within the task view based on the usage ranking for the application in the set of applications.

* * * * *